United States Patent
Vinayagamurthy et al.

(10) Patent No.: US 11,836,269 B2
(45) Date of Patent: Dec. 5, 2023

(54) PROTECTION OF DATA OF DATABASE CLIENTS FROM PERSISTENT ADVERSARIES

(71) Applicant: International Business Machines Corporation, Armonk, NY (US)

(72) Inventors: Dhinakaran Vinayagamurthy, Erode (IN); Utsav Singhal, Kota (IN); Akshar Kaul, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 309 days.

(21) Appl. No.: 17/408,878

(22) Filed: Aug. 23, 2021

(65) Prior Publication Data

US 2023/0055992 A1    Feb. 23, 2023

(51) Int. Cl.
*G06F 21/62* (2013.01)
*G06F 21/55* (2013.01)
*G06F 21/60* (2013.01)

(52) U.S. Cl.
CPC ........ *G06F 21/6227* (2013.01); *G06F 21/556* (2013.01); *G06F 21/602* (2013.01); *G06F 21/6245* (2013.01)

(58) Field of Classification Search
CPC .. G06F 21/6227; G06F 21/556; G06F 21/602; G06F 21/6245
See application file for complete search history.

(56) References Cited

U.S. PATENT DOCUMENTS

| | | |
|---|---|---|
| 9,455,831 B1 | 9/2016 | Grubbs |
| 2013/0191650 A1 | 7/2013 | Balakrishnan et al. |
| 2015/0178507 A1 | 6/2015 | Haerterich et al. |
| 2017/0300703 A1* | 10/2017 | Deshpande ......... G06F 21/6218 |
| 2018/0019866 A1* | 1/2018 | Kerschbaum ......... H04L 9/0618 |
| 2019/0156057 A1* | 5/2019 | Nissim Kobliner ......... G06F 16/9535 |
| 2020/0266972 A1* | 8/2020 | Chakraborty ......... H04L 9/0894 |

* cited by examiner

*Primary Examiner* — Ayoub Alata
(74) *Attorney, Agent, or Firm* — Ference & Associates LLC

(57) ABSTRACT

One embodiment provides a method, including: receiving, at a database proxy acting as an intermediary between a plurality of database clients and a service provider providing data management services for the plurality of database clients, a set of queries, of at least one of the plurality of database clients, for data stored at the service provider in an encrypted form, wherein the database proxy maintains a security budget defining a maximum threshold amount of data leakage for the plurality of database clients; batching the set of queries into query batches; transforming, for each query batch, each query within the query batch, wherein the transforming includes changing the query to reduce data leakage; performing, responsive to transforming each query within the query batch, a transformation on each of the query batches to reduce data leakage; executing, at the database proxy and utilizing an order-preserving encryption algorithm, the query batches; and calculating a remaining security budget based upon data leakage resulting from the executing.

20 Claims, 5 Drawing Sheets

PROTECTION OF DATA OF DATABASE CLIENTS FROM PERSISTENT ADVERSARIES

BACKGROUND

The movement of data from local storage to remote storage is becoming more common. Additionally, instead of fully moving the data to remote storage, an entity may simply make the data accessible via a remote storage entity. This is particularly true if the data owner wants the data to be accessible by many different entities and from many different locations. By placing or storing the data with or facilitating access to the data via a storage provider (e.g., cloud service provider, remote service provider, on-premises service provider, etc.), the data owner is able to allow access to the data to any entities that are authorized to access the data from any location. Additionally, by moving the data to or providing access to the data through a service provider, the data owner is also moving some management duties and resource requirements to the service provider. For example, the data owner no longer has to manage the data and respond to queries by entities accessing the data. Rather, the service provider is responsible for providing responses to any queries.

BRIEF SUMMARY

In summary, one aspect provides a method, including: receiving, at a database proxy acting as an intermediary between a plurality of database clients and a service provider providing data management services for the plurality of database clients, a set of queries, of at least one of the plurality of database clients, for data stored at the service provider in an encrypted form, wherein the database proxy maintains a security budget defining a maximum threshold amount of data leakage for the plurality of database clients; batching, at the database proxy, the set of queries into query batches; transforming, at the database proxy and for each query batch, each query within the query batch, wherein the transforming includes changing the query to reduce data leakage; performing, at the database proxy and responsive to transforming each query within the query batch, a transformation on each of the query batches to reduce data leakage; executing, at the database proxy and utilizing an order-preserving encryption algorithm, the query batches; and calculating, at the database proxy, a remaining security budget based upon data leakage resulting from the executing of the query batches.

Another aspect provides an apparatus, including: at least one processor; and a computer readable storage medium having computer readable program code embodied therewith and executable by the at least one processor; wherein the computer readable program code is configured to receive, at a database proxy acting as an intermediary between a plurality of database clients and a service provider providing data management services for the plurality of database clients, a set of queries, of at least one of the plurality of database clients, for data stored at the service provider in an encrypted form, wherein the database proxy maintains a security budget defining a maximum threshold amount of data leakage for the plurality of database clients; wherein the computer readable program code is configured to batch, at the database proxy, the set of queries into query batches; wherein the computer readable program code is configured to transform, at the database proxy and for each query batch, each query within the query batch, wherein the transforming includes changing the query to reduce data leakage; wherein the computer readable program code is configured to perform, at the database proxy and responsive to transforming each query within the query batch, a transformation on each of the query batches to reduce data leakage; wherein the computer readable program code is configured to execute, at the database proxy and utilizing an order-preserving encryption algorithm, the query batches; and wherein the computer readable program code is configured to calculate, at the database proxy, a remaining security budget based upon data leakage resulting from the executing of the query batches.

An additional aspect provides a computer program product, including: a computer readable storage medium having computer readable program code embodied therewith, the computer readable program code executable by a processor; wherein the computer readable program code is configured to receive, at a database proxy acting as an intermediary between a plurality of database clients and a service provider providing data management services for the plurality of database clients, a set of queries, of at least one of the plurality of database clients, for data stored at the service provider in an encrypted form, wherein the database proxy maintains a security budget defining a maximum threshold amount of data leakage for the plurality of database clients; wherein the computer readable program code is configured to batch, at the database proxy, the set of queries into query batches; wherein the computer readable program code is configured to transform, at the database proxy and for each query batch, each query within the query batch, wherein the transforming includes changing the query to reduce data leakage; wherein the computer readable program code is configured to perform, at the database proxy and responsive to transforming each query within the query batch, a transformation on each of the query batches to reduce data leakage; wherein the computer readable program code is configured to execute, at the database proxy and utilizing an order-preserving encryption algorithm, the query batches; and wherein the computer readable program code is configured to calculate, at the database proxy, a remaining security budget based upon data leakage resulting from the executing of the query batches.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
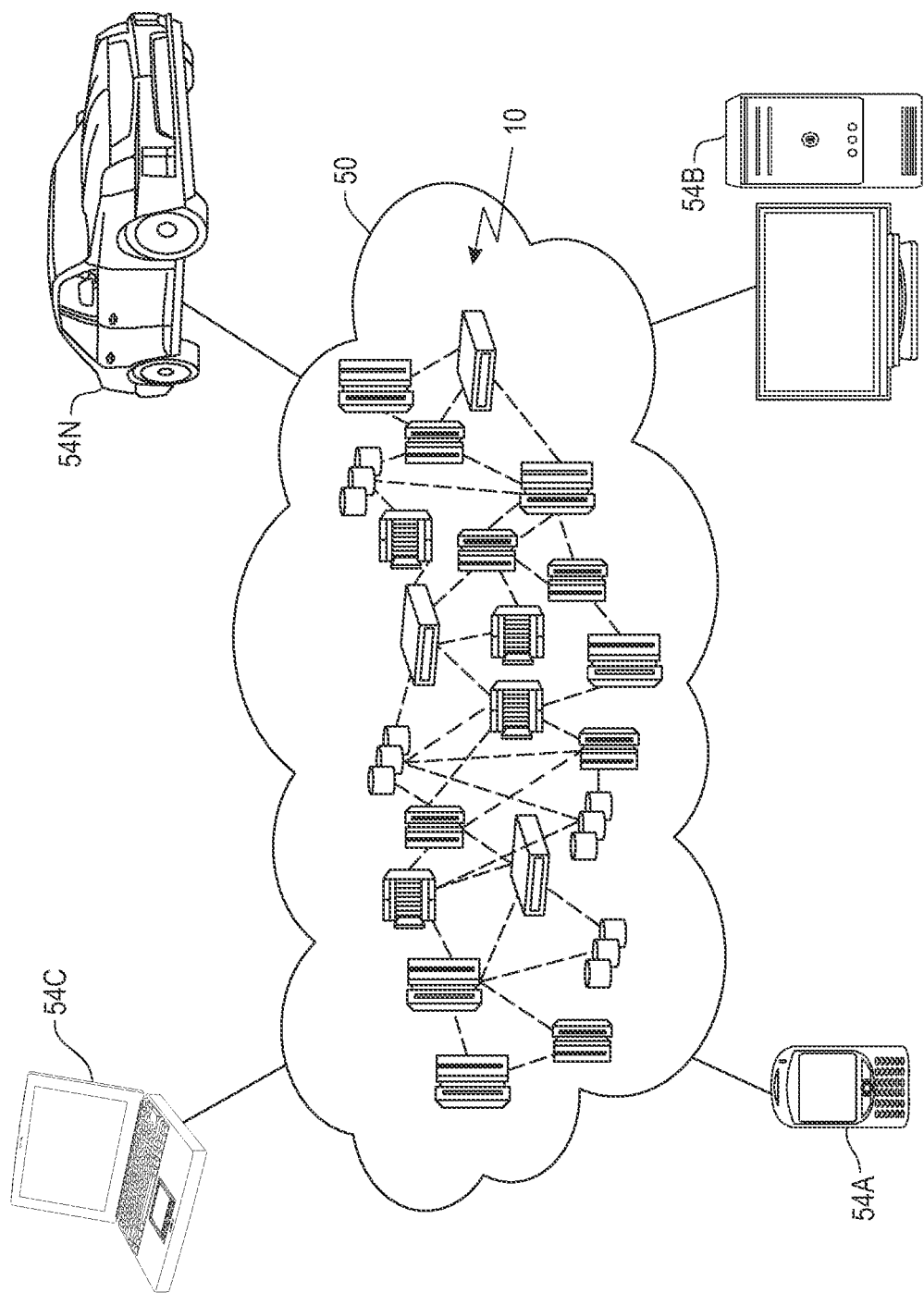
FIG. 1 depicts a cloud computing environment according to an embodiment of the present invention.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resource but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
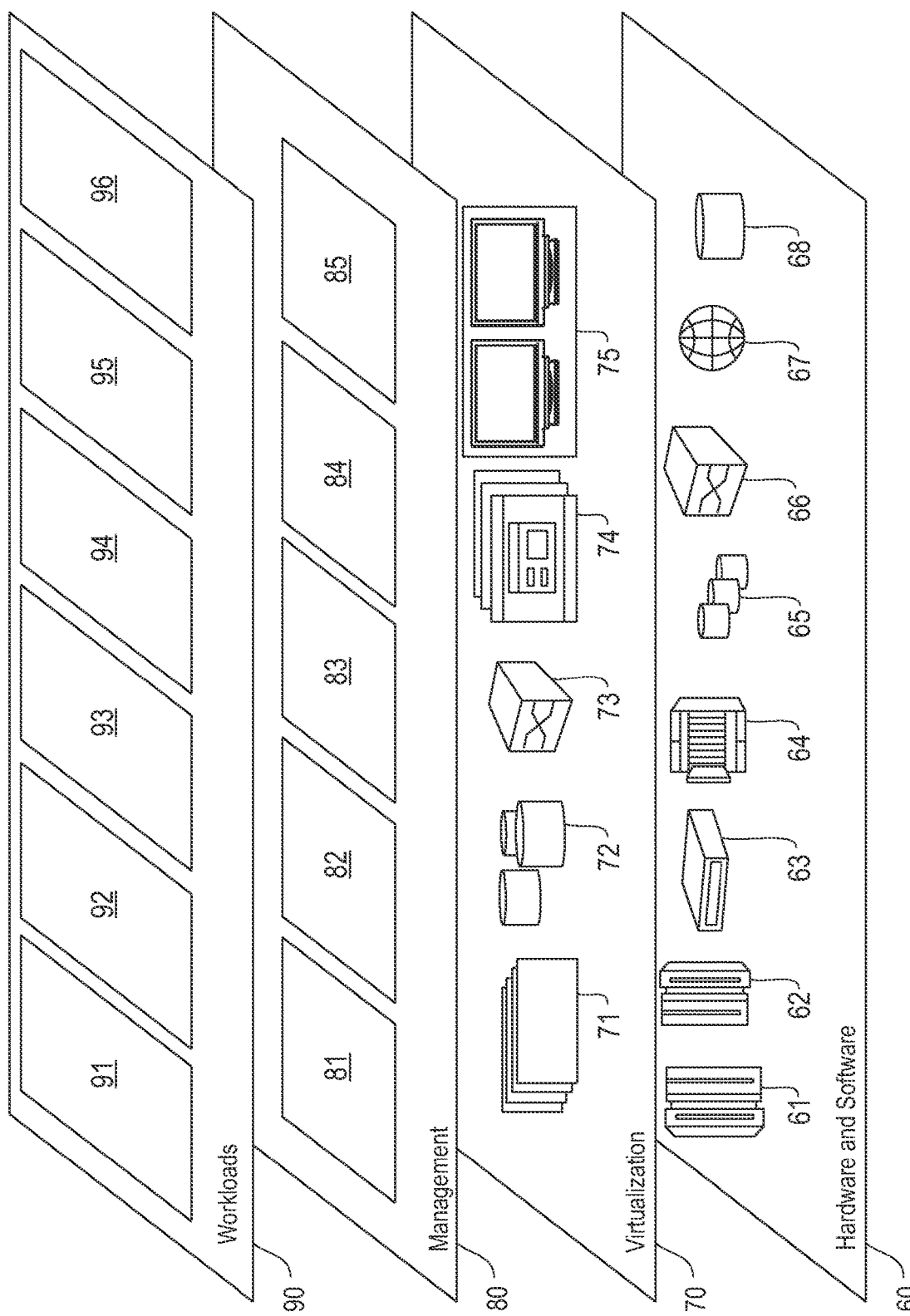
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data storage and query response 96.

Storing data at a remote location opens the data up to being stolen by other entities, for example, the entity or service provider that is storing the data. The data owner trusts the service provider to provide truthful responses to queries and otherwise fulfill the responsibilities of the service provider. However, the data owner does not trust the service provider to not infer and learn information about the underlying data. One technique for addressing this problem is to encrypt the data before placing it onto the database maintained by the service provider. However, this requires that the data owner encrypt the data before storing it on the database. This also requires the data owner to do some decryption for providing responses to queries. The decryption to be done, whether of the data or the query response, depends upon the encryption scheme used for encrypting the database. This becomes very cumbersome for the data owner and requires that the data owner maintain processing capabilities to respond to queries. The type and amount of processing capability needed form the data owner varies depending on the encryption scheme used to encrypt the data.

One solution is to use an intermediary or a trusted proxy to offload the processing requirements of the data owner. All of the database clients can connect to the trusted proxy instead of to the data owner. The trusted proxy can be hosted either by the data owner on the infrastructure of the data owner or the service provider, in this case the infrastructure used to host the database proxy should be a trusted execution environment, such that even the service provider cannot get access to what is happening inside the trusted proxy. This infrastructure can be based on trusted hardware for example.

One conventional way to prevent adversaries from learning information about the underlying data, while enabling some queries to happen directly over the encrypted data, is to use property-preserving encryption. This type of encryption uses ciphertexts that preserves some property of the underlying plaintext. However, this technique is not effective against snapshot adversaries that extract a single snapshot of the database content and who use inference attacks that assume the adversary has background information about the data that has been encrypted. Additionally, such techniques are not effective against persistent adversaries that continue to access or monitor the data. Other cryptographic tools, for example, fully-homomorphic encryption and oblivious RAM, may be used but are impractical for use with data that is subject to queries. For example, fully-homomorphic encryption is not applicable for dynamic databases and would require rewriting the database engine. Oblivious RAM does not allow for indexing making it impractical for use with the data that is subject to user queries. Another conventional technique is to use differential privacy which means that data records cannot be inferred from query results. However, this only works for queries that are requesting analysis of the underlying data and does not work if a particular data record or set of data records is being retrieved.

Accordingly, an embodiment provides a system and method for using a database proxy to interface between database clients and a service provider while ensuring that the data of the database clients is protected against both snapshot adversaries and persistent adversaries. The system receives a set of queries from one or more users. These queries are received at a database proxy that acts as an intermediary between a plurality of database clients and a service provider. A user provides the query(s) to the database proxy. The database proxy is responsible for encrypting and decrypting the underlying data and responding to queries received from the users. Accordingly, the database proxy maintains a security budget for the database clients (also referred to as users) which is used in the described system as one component for thwarting persistent adversaries. The security budget defines a maximum threshold amount of data leakage for the database clients. Data leakage is the concept that as responses are returned in response to queries, some information regarding the underlying data is leaked. Thus, as more and more queries are performed, a persistent adversary can monitor the database system completely, including all the queries to it and its responses, and learn more and more information about the underlying data.

In order to prevent a persistent adversary from learning too much information about the underlying data, the described system and method uses modules, encryption techniques, and the security budget to maintain the privacy of the underlying data, even from a persistent adversary. Thus, upon receipt of the set of queries, the database proxy batches the set of queries into query batches. The database proxy then individually transforms each query within each query batch in order to reduce data leakage due to the query execution while maintaining the performance, including the false positives from the database engine that has to be filtered by the database proxy, at an acceptable level. Once all the queries are transformed, the database proxy performs a transformation on the query batch as a whole. Once the query batches are transformed, the database proxy executes the query batches using an order-preserving encryption algorithm. After queries are executed, the database proxy calculates the remaining security budget based upon the data leakage that has occurred due to executing the queries. If the remaining security budget is below a particular threshold, the system re-encrypts the data, thereby resetting the security budget.

Thus, in the overall system, the data owner has outsourced its data, for example in the form of a database, to a service provider. The system includes a database proxy which has been setup to work in a secure environment. All the users, or database clients, can connect to the database proxy for any database operations. The data owner can configure the database proxy to use order preserving encryption. The system can also use other or additional property preserving encryption schemes, for example, a flipped order preserving encryption scheme. The encryption keys are provided to the database proxy. For an insert/update query, data is encrypted using order preserving encryption before it is stored. For a select query, an appropriate transformation is done and the transformed query is executed on the database. The result set of the query is decrypted appropriately before passing it back to the user. The security budget to be maintained is also provided to the database proxy. The security budget can also be dynamically changed by the data owner.

Such a system provides a technical improvement over current systems for securing data stored or managed with a service provider from adversaries. The described system and method provide a technique that protects data of database clients from both snapshot adversaries and persistent adversaries. The security provided by the system and method is based upon the security guarantees provided by the differential privacy mechanisms, but, unlike conventional differential privacy applications, the described method prevents an adversary from learning about the underlying data even if a particular record or set of records is being retrieved in response to the query. The described system also supports querying over dynamic data with insert and delete functions allowed on the encrypted data, unlike conventional encryption systems, which try to protect against only snapshot adversaries while this described system and method protects against even persistent adversaries. Thus, the described system and method provides techniques for protecting data stored or managed with a service provider from persistent adversaries which is not contemplated using conventional encryption techniques, particularly for dynamic data that is stored or managed by a service provider and that can be queried by users.

Figure 3:
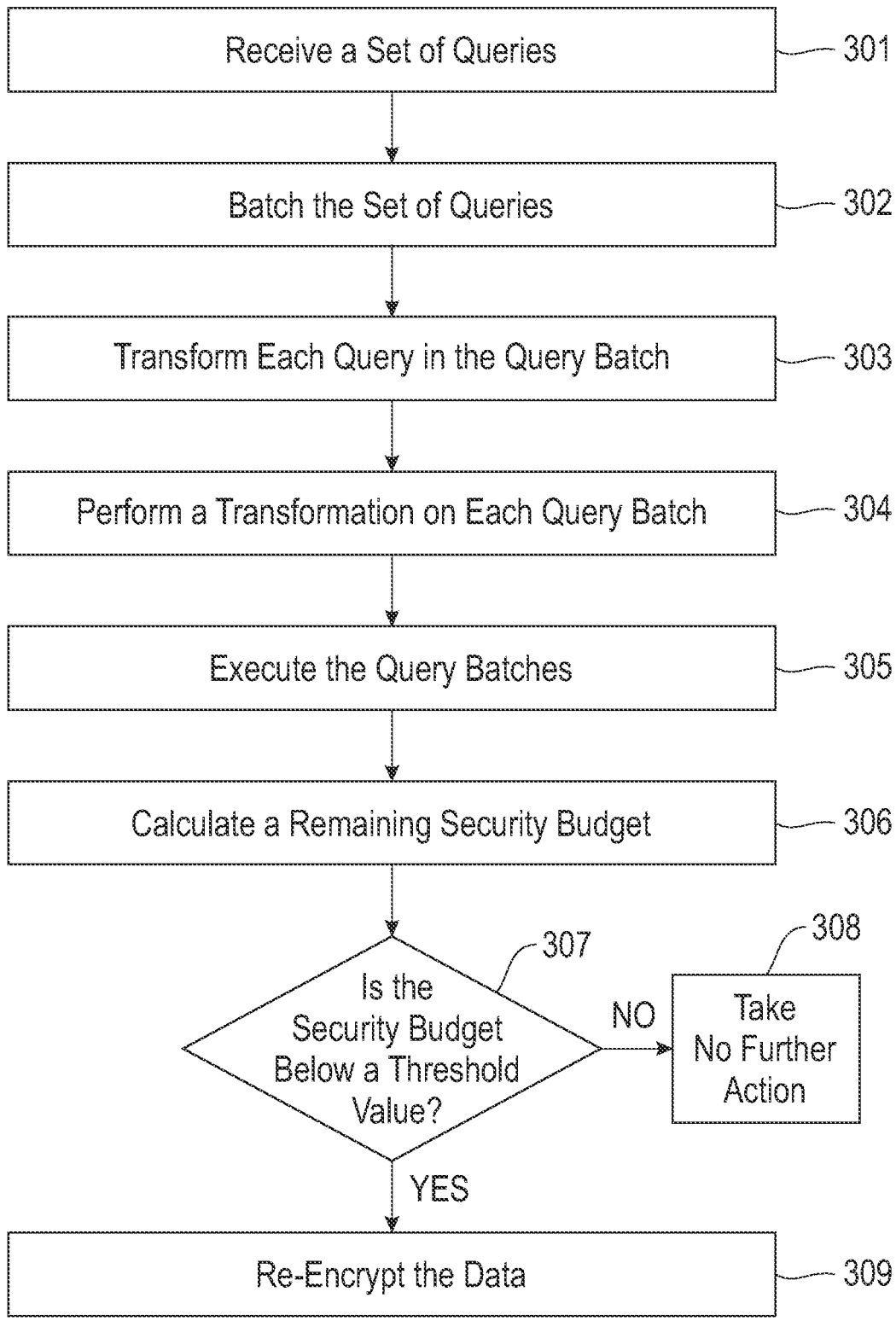
FIG. 3 illustrates a method of using a database proxy to interface between database clients and a service provider while ensuring that the data of the database clients is protected against both snapshot adversaries and persistent adversaries.

FIG. 3 illustrates a method for using a database proxy to interface between database clients and a service provider while ensuring that the data of the database clients is protected against both snapshot adversaries and persistent adversaries. The example data that will be used here throughout is the example of key-value stores. This example is used for the ease of readability, but it should be understood that the described system and method can be applied to many more types of data that are stored in databases. At 301 the database proxy receives a set of queries from one or more database clients. The database proxy acts as an intermediary between the database clients (or users) and the service provider. The database proxy is responsible for encrypting the data of the databased clients. The database proxy is also responsible for responding to the queries and is, therefore, responsible for decrypting the data of the database clients in order to provide the responses to the queries.

However, since the database clients do not want to reveal information about the underlying data to adversaries, which include the service provider, the database proxy is also responsible for taking measures to thwart the adversaries. To this end, the database proxy maintains a security budget for the database or data of the database clients. The security budget defines a maximum threshold amount of data leakage that is allowed to happen as a side effect of executing queries over the data. As responses to queries are generated and provided, some information about the underlying data will get leaked to an adversary, which may be the service provider. This is referred to as data leakage. An adversary that continually observes the entire query execution including the input query and output responses, like the service provider, is referred to as a persistent adversary and is able to infer and learn information about the underlying data with each query. The database proxy calculates the leakage due to each query using a leakage function. This leakage is then subtracted from the current remaining security budget At 302 the database proxy batches the set of queries into query batches. The size of the query batches may be set by the database proxy, be defined based upon attributes of the queries within the batches, or the like. Since the database proxy has and communicates with a plurality of database clients, each query batch may include queries of more than one of the database clients. In other words, the database proxy batches the set of queries received for all of its clients. Alternatively, the database proxy may separate the queries into batches based upon the database client, meaning each batch will only have queries of a single database client. The database proxy may separate the queries by database client based upon requirements of the database client. For example, some database clients may have requirements that queries directed to data of the database client cannot be batched with queries directed to data of another database client.

At 303 the database proxy transforms each query within a query batch. In other words, the database proxy transforms the queries individually for each query batch. The transformation function used in transforming the individual queries may transform the query in such a manner that the amount of data leakage is reduced while maintaining the performance, including the false positives from the database engine that has to be filtered by the database proxy, at acceptable levels. The transformation function utilized for the individual query transformation may be referred to as a private query transformation function. For the private query transformation, the input is the query and a set of flip bits used in Flipped Order Preserving Encryption+ (FOPE+). The output of the private query transformation is the transformed query.

Order-preserving encryption (OPE) is a type of property preserving encryption scheme that preserves the order of plain text in the cipher text domain. The security guarantee provided by order preserving encryption is that it only leaks the order amongst the cipher text. An OPE scheme providing such a guarantee is stateful, meaning that it maintains a state which is updated after each encryption. The state is usually stored in the form of a tree data structure such as a B-tree, also referred to as a value tree herein. Each B-tree has nodes, called leafs or leaf nodes, that represent different values that are encrypted with a client key. The complexity of insert and search operations on a B-tree is O(log n) where n is the number of values stored in the tree. Flipped OPE is a variation of OPE in which the cipher texts do not always follow the plain text order. It is implemented by adding flip bits to each node of the B-tree. These flip bits allow selectively breaking the property of B-tree that all its children should be in order. OPE provides very minimal security and inference attacks can be mounted against it. Additionally, it does not protect against persistent adversaries. Flipped OPE is resilient to inference attacks for snapshot adversaries but does not protect against persistent adversaries.

The described system and methods develops and uses FOPE+ as the underlying encryption scheme which is a more secure version of Flipped OPE. FOPE+ uses frequency hiding and uniform random picking of the children when traversing down the OPE tree. Whenever a new key or other data value is added to the tree, the order among the keys of the internal node is flipped (or not), thereby randomizing the order of each key in the leaf nodes. FOPE+ provides information theoretic security against snapshot adversaries when data is sampled randomly from an arbitrary distribution. However, FOPE+ by itself cannot provide security against persistent adversaries. Thus, the described system and methods as further described herein provide security against persistent adversaries while using FOPE+ as one of the underlying building blocks.

The process for performing the private query transformation is dependent on the type of query that is being transformed. For an insert query type, the transformation works by first changing the distribution of the input data to come close to uniform. The goal is to try to hide the location of where the data is inserted within the tree, so this problem is similar to the problem of dynamically updating histograms without information leakage. The system may hide data inserted by the query by issuing fake insert queries. The system then utilizes a differential-privacy mechanism for dynamic histograms to keep the information private. One example method for an insert query includes maintaining a counter for each data element stored in the database. The database consists of count repetitions for each element. The system samples a Laplacian noise for each data element in the database. For each data element being inserted by the current query 1+Laplacian noise is added to the count. For other elements, 0+Laplacian noise is added to the count. It should be noted that the noise can also be a negative value.

The system maintains two additional structures apart from the main list, a stash and a tail list. The stash is used to store data elements which cannot be added to the main list due to the negative noise assigned to them in the current query. The tail list consists of those values from the main list whose frequency is below a cut-off threshold. The cut-off threshold can be dynamically generated for each query. It should be noted that there will be many low frequency entries within the list of entries and for all values within the list of entries below the cut-off frequency, a separate constant-sized frequency-hiding OPE encrypted list that contains all the real values whose frequencies fall below the cut-off and the rest of the values are fake entries.

For a GetKey query type, where a specific value is being requested, no transformation is made to the query because these queries can be executed without any leakage. These queries can be answered by using a Lookup data structure built on top of the OPE tree and does not need to access the OPE tree. For a GetRange query type, where a range of values is being requested (e.g., all values between a low and high value), the system uses the flip bits in the OPE tree to identify the splits in the given query range. This results in a union of range queries ($Q_{Ti}$) for the given query. The query belonging to each split is transformed independently. For this transformation, the system decides the level in the OPE tree below which the transformation should not go. This level is decided independently for each transformation based on the remaining security budget for the subtree associated with the query. This restriction on the transformation can result in query result having false positives. These false positives are then filtered by the database proxy before the result set is returned to the user (or database client).

There are multiple ways to transform a query differing in leakage and cost associated with them. The system can solve an optimization problem to find the transformation which will give the best tradeoff between the cost associated with the query and the security leakage associated with the query. Let L be the leakage function describing the leakage associated with a query and C be the cost function describing the expected cost of running a query. The system then finds the transformed query ($Q_T$) for input query Q, such that ($W_1$*(L(Q)−L($Q_{T1}$)))+($W_c$*(C($Q_{T1}$)−C(Q))) is minimized. It is always possible to find a solution to this optimization problem since the possible number of transformed queries (i.e., $Q_T$) is bounded. $W_1$ and $W_c$ are weights attached to security leakage due to query and query cost, respectively. These can be chosen based on user requirements and current system load.

At 304 the database proxy performs a transformation on each of the query batches after the queries within each batch have been transformed. The output of the transformation is a transformed query set. It should be noted that the size of the output transformed query set may be different than the size of the input query batch. For example, the output batch size may be smaller than the input query batch size. One reason for this is that the database proxy may recognize that two or more queries are the same or similar queries that would return the same information, so the database proxy may remove the duplicate queries. Another reason for this may be that the database proxy may recognize that multiple queries would return the same information or overlapping information, so the database proxy may combine the multiple queries into a single query and adjust the query so that all the requested information would be returned. As another example, the output batch size may be larger than the input query batch size. One reason for this is that the database proxy may split a single query into multiple queries.

In performing the batch transformations, the database proxy may identify range queries in the batch that have near-contiguous transformed query ranges. These range queries can be combined to create a single transformed query. As an example, if two queries are requesting overlapping values, the database proxy may combine the two queries into a single query having the entire range of the two queries. For range queries, the database proxy can augment false-positive ranges to the query. This reduces the security leakage due to the query. For a set of queries in the batch, the fake insert queries required to maintain security leakage can be minimized.

The system may also optimize the transformation of the query batches by creating and solving an optimization problem. In this optimization problem the transformed query batch ($Q_{T2}$) can be found such that ($W_1$*(L($Q_{T1}$)−L($Q_{T2}$)))+($W_c$*(C($Q_{T2}$)−C($Q_{T1}$))) is minimized across $Q_{T2}$, where L is the leakage function describing the leakage associated with a query and C be the cost function describing the expected cost of running a query. Additionally, some database engines provide a technique to predict future queries ($Q_{fut}$). If the database engine provides such a feature, then the system can also add a leakage component for predicted future queries. An example optimization problem including future queries may be found such that ($W_1$*(L($Q_{T1}$)−L($Q_{T2}$)−L($Q_{fut}$)))+($W_c$*(C($Q_{T2}$)−C($Q_{T1}$))) is minimized across $Q_{T2}$. $W_1$ and $W_c$ are weights attached to security leakage due to query and query cost, respectively. These can be chosen based on user requirements and current system load.

At 305 the database proxy executes the query batches utilizing an order-preserving encryption algorithm. The order-preserving encryption algorithm may be the FOPE+ algorithm discussed above. This protects against snapshot adversaries and provides information-theoretic security against snapshot adversaries for any input distribution.

At 306 the database proxy calculates a remaining security budget based upon data leakage that results from executing the transformed query. To calculate the remaining security budget, the database proxy calculates the data leakage that occurred due to executing the query. To compute the data leakage, the database proxy may use one or more leakage functions. One leakage function is based upon access patterns which means the leakage is a function of the distance between the distribution due to access of leaf level keys (D) and the uniform distribution (U). Thus, the leakage function would be dist(D,U). The cost associated with executing this query is (number of leaf level keys access)/(actual result set keys) (C). Each node in the tree maintains the count of times when it was accessed. Thus, for a mutation (discussed in more detail below) the system chooses a node with the highest increase in security per mutation which is defined as the sum(count of leaf node keys that will be mutated)/(number of leaf node keys).

Another leakage function is based upon the order between elements. This leakage function is the inverse of total number of permutations possible for elements inserted until now. When the number of data elements in the database is equal to N, the ideal leakage is 1/N!. The system ensures that the InvLeakage≥min(N!, $2^\lambda$), where λ is the security parameter. The leakage with FOPE+ for a snapshot adversary is 1/N!. For a persistent adversary setting, leakage is maintained at every node in the tree. B-tree with high branching factor makes this possible in practice. Specifically, the inverse function P of leakage at each node is P(Node-i)=Agg (L(child-1), . . . , L(child-t)); Agg($x_1$, . . . , $x_t$)=t!*$x_1$* . . . *$x_t$; and P(leaf)=n!, where n is the number of elements in the leaf node. For an insert query the proxy updates P(leaf) from n! to (n+1)!. Additionally, the system updates the leakage at each node in the path from that leaf to the root using the recursive function. For a GetRange query no update is made to the leakage function if a complete sub-tree is returned. Otherwise, for every node with a split for children in range and not in range, P(common ancestor with a split)=2*Agg (L(child-i))*Agg(L(child-not-i)) where i is the children part of the range.

Thus, the database proxy subtracts the leakage resulting from the execution of the queries from the security budget. The database proxy compares this new security budget to a threshold value, which may be set by the database proxy, a database client, or the like, and determines if the resulting security budget is below a threshold value at 307. If the resulting security budget is greater than the threshold value, meaning the leakage is not above a predetermined threshold, the database proxy takes no further action at 308 and waits for additional queries to execute. Subsequent leakage due to executed queries are subtracted from the resulting security budget until the resulting security budget reaches or falls below the predetermined threshold. If, on the other hand, the resulting security budget is less than the threshold value, meaning the leakage has reached or exceed a predetermined threshold, the database proxy re-encrypts the data at 309. After the re-encryption the remaining security budget is reset to the starting value and subsequent leakage due to executed queries are subtracted from the reset security budget.

In addition to performing the mutation or re-encryption upon the security budget falling below a particular threshold, the mutation or re-encryption may occur if no encoding is available or upon a rebalancing of the OPE state tree. Re-encrypting the data mutates the data with a new encryption so that any information gleaned before the re-encryption from the data leakage cannot be correlated with any information gleaned after the re-encryption since the encryptions are now different. When re-encrypting the data, the database proxy may use a mutation component. The mutation component chooses the subtree that will be mutated to maximize the gain in security per mutation.

The database proxy does the re-encryption in a smart manner. If the re-encryption needs to be done due to encoding not available during the insert query, then the insert query is pre-empted and the actual re-encryption is done in a background thread. This ensures that the query responses are not delayed because of insert queries in the batch needing re-encryptions. During re-encryption all the elements in the subtree being mutated are re-encrypted. Re-encryption of a subtree removes the linkage between elements before and after the re-encryption so that even a persistent adversary who observes the OPE tree cannot learn information about the underlying data. Thus, the re-encryption resets all leakage counts and achieves ideal security at the instant of mutation for the elements in the subtree. However, the re-encryption does come at a performance cost. Specifically, while the re-encryption is occurring, the subtree being re-encrypted is blocked from being used in query responses. Additionally, the complexity is linear in size to the subtree being mutated. However, the cost is amortized over time.

Figure 4:
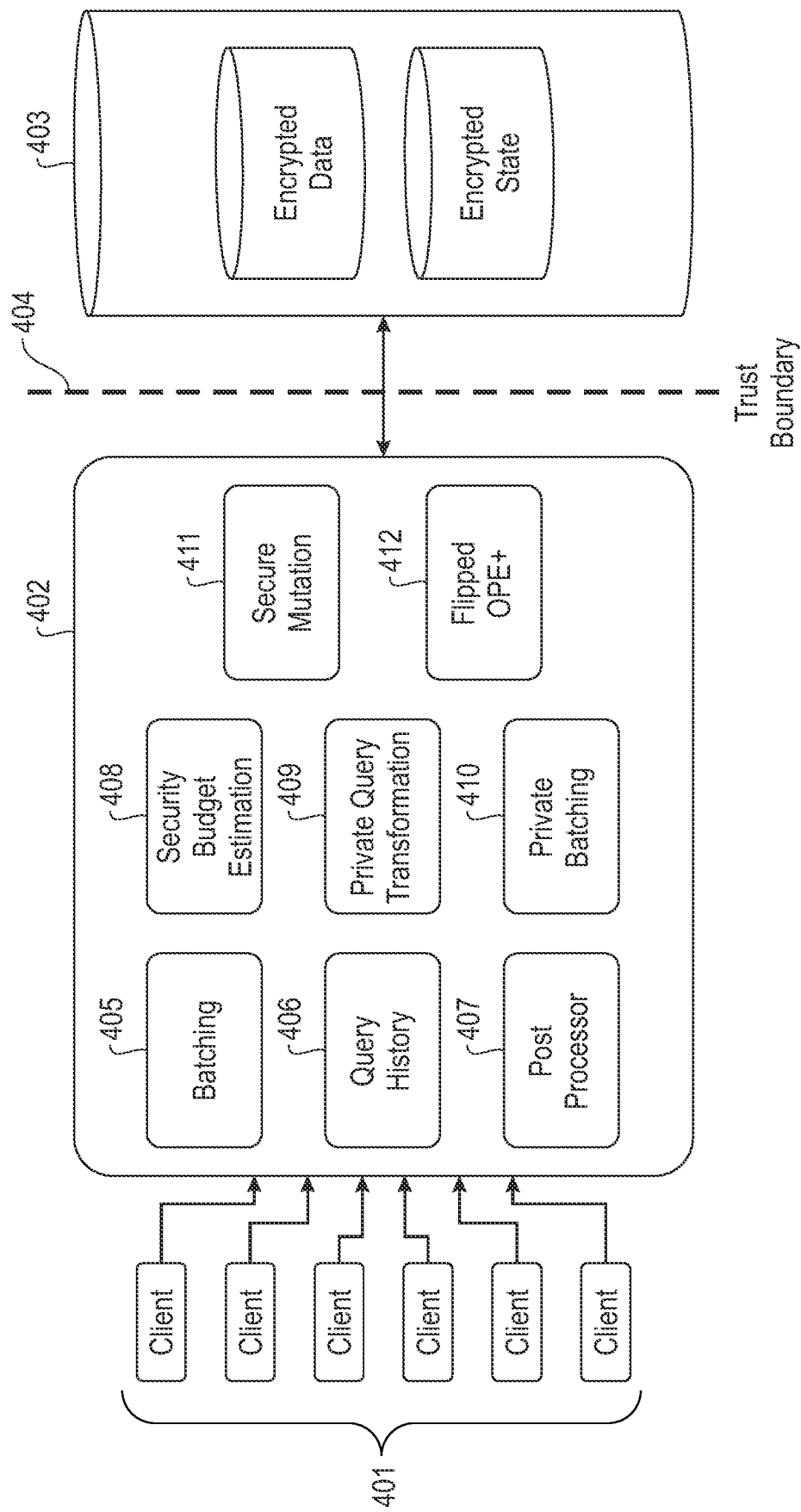
FIG. 4 illustrates an example overall system architecture for using a database proxy to interface between database clients and a service provider while ensuring that the data of the database clients is protected against both snapshot adversaries and persistent adversaries.

FIG. 4 illustrates an overall example of a system architecture for using a database proxy to interface between database clients and a service provider while ensuring that the data of the database clients is protected against both snapshot adversaries and persistent adversaries. The client 401 outsources the encryption and decryption of data of the client 401 to a database proxy 402. The database proxy 402 interfaces with the service provider 403 to respond to queries received from clients. Thus, the trust boundary 404 extends to the database proxy 402, but not to the service provider 403. Accordingly, the database proxy 402 uses different modules to ensure that the service provider 403, a persistent adversary, cannot learn information about the underlying data belonging to the database clients 401.

These modules include a batching module 405 that batches the sets of queries into query batches, a query history module 406 that keeps a history of previous queries, and a post processor 407 that is used to clean up the query responses before being sent to the client 401. The database proxy 402 also includes a security budget estimation module 408 that estimates and keeps track of the security budget. The private query transformation module 409 transforms the individual queries and the private batching module 410 transforms the query batches having the transformed queries. The secure mutation module 411 is used to re-encrypt the underlying data when needed. The Flipped OPE+ module 412 is used to execute the queries.

Thus, the described system and method provides a secure database-as-a-service for data managed by a service provider with differential privacy guarantees even for persistent adversaries. The system also supports range queries over the encrypted data for a dynamically changing dataset and additionally supports the creation of indexes over encrypted data which can be used at runtime to speed up processing. Additionally, the described system and method provides an information-theoretic security guarantee against a snapshot adversary when the data is sampled randomly from any input distribution. Thus, the described system and method provides protection against both snapshot and persistent adversaries, while still allowing many of the functions that are requested for data subject to user queries.

Figure 5:
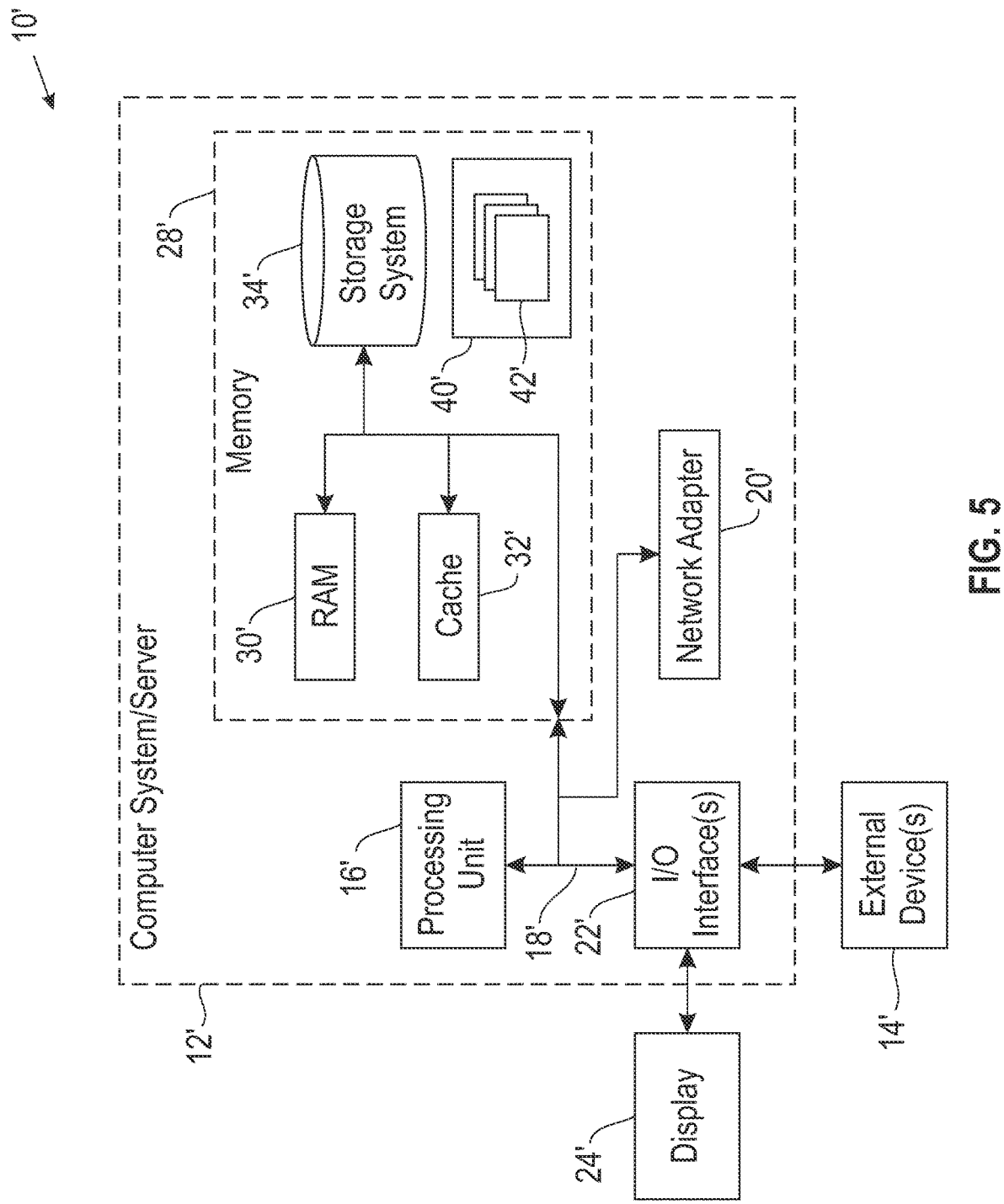
FIG. 5 illustrates a computer system.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   receiving, at a database proxy acting as an intermediary between a plurality of database clients and a service provider providing data management services for the plurality of database clients, a set of queries, of at least one of the plurality of database clients, for data stored at the service provider in an encrypted form, wherein the database proxy maintains a security budget defining a maximum threshold amount of data leakage for the plurality of database clients;
   batching, at the database proxy, the set of queries into a plurality of query batches;
   transforming, at the database proxy and for each of the plurality of query batches, each query of queries within each of the plurality of query batches, wherein the transforming comprises changing each of the queries to reduce the data leakage;
   performing, at the database proxy and responsive to transforming each of the queries within each of the plurality of query batches, a transformation on each of the plurality of query batches to reduce the data leakage;
   executing, at the database proxy and utilizing an order-preserving encryption algorithm, the plurality of query batches; and
   calculating, at the database proxy, a remaining security budget based upon the data leakage resulting from the executing of the plurality of query batches.

2. The method of claim 1, comprising re-encrypting the data responsive to determining that the remaining security budget is below a predetermined threshold value.

3. The method of claim 2, wherein the security budget is reset responsive to re-encrypting the data.

4. The method of claim 1, wherein the order-preserving encryption algorithm comprises maintaining a value tree in a database for each of the plurality of database clients and maintained in the database proxy and modifying an order of values in the value tree as new values are added to the value tree.

5. The method of claim 1, wherein the transforming is based upon a type of a query of the queries within a query batch of the plurality of query batches.

6. The method of claim 5, wherein the type comprises an insert query and wherein the transforming comprises hiding data inserted by the query by issuing fake insert queries.

7. The method of claim 5, wherein the type comprises a range query and wherein the transforming comprises identifying splits in a range corresponding to the range query and defining, based upon the security budget, a level in a value tree below which the query should not be transformed.

8. The method of claim 1, wherein the performing comprises creating, by combining sets of transformed values, at least one transformed query and augmenting false-positives.

9. The method of claim 1, wherein the data leakage is calculated based upon a function of a distance between a distribution of access and a uniform distribution.

10. The method of claim 1, wherein the data leakage is calculated based upon an order between elements.

11. An apparatus, comprising:
    at least one processor; and
    a computer readable storage medium having computer readable program code embodied therewith and executable by the at least one processor;
    wherein the computer readable program code is configured to receive, at a database proxy acting as an intermediary between a plurality of database clients and a service provider providing data management services for the plurality of database clients, a set of queries, of at least one of the plurality of database clients, for data stored at the service provider in an encrypted form, wherein the database proxy maintains a security budget defining a maximum threshold amount of data leakage for the plurality of database clients;
    wherein the computer readable program code is configured to batch, at the database proxy, the set of queries into a plurality of query batches;
    wherein the computer readable program code is configured to transform, at the database proxy and for each of the plurality of query batches, each query of queries within each of the plurality of query batches, wherein the transforming comprises changing each of the queries to reduce the data leakage;
    wherein the computer readable program code is configured to perform, at the database proxy and responsive to transforming each of the queries within each of the plurality of query batches, a transformation on each of the plurality of query batches to reduce the data leakage;
    wherein the computer readable program code is configured to execute, at the database proxy and utilizing an order-preserving encryption algorithm, the plurality of query batches; and
    wherein the computer readable program code is configured to calculate, at the database proxy, a remaining security budget based upon data leakage resulting from the executing of the plurality of query batches.

12. A computer program product, comprising:
    a computer readable storage medium having computer readable program code embodied therewith, the computer readable program code executable by a processor;
    wherein the computer readable program code is configured to receive, at a database proxy acting as an intermediary between a plurality of database clients and a service provider providing data management services for the plurality of database clients, a set of queries, of at least one of the plurality of database clients, for data stored at the service provider in an encrypted form, wherein the database proxy maintains a security budget defining a maximum threshold amount of data leakage for the plurality of database clients;
    wherein the computer readable program code is configured to batch, at the database proxy, the set of queries into a plurality of query batches;
    wherein the computer readable program code is configured to transform, at the database proxy and for each of the plurality of query batches, each query of queries within each of the plurality of query batches, wherein the transforming comprises changing each of the queries to reduce the data leakage;

wherein the computer readable program code is configured to perform, at the database proxy and responsive to transforming each of the queries within each of the plurality of query batches, a transformation on each of the plurality of query batches to reduce the data leakage;

wherein the computer readable program code is configured to execute, at the database proxy and utilizing an order-preserving encryption algorithm, the plurality of query batches; and wherein the computer readable program code is configured to calculate, at the database proxy, a remaining security budget based upon the data leakage resulting from the executing of the plurality of query batches.

13. The computer program product of claim 12, comprising re-encrypting the data responsive to determining that the remaining security budget is below a predetermined threshold value and wherein the security budget is reset responsive to re-encrypting the data.

14. The computer program product of claim 12, wherein the order-preserving encryption algorithm comprises maintaining a value tree in a database for each of the plurality of database clients and maintained in the database proxy and modifying an order of values in the value tree as new values are added to the value tree.

15. The computer program product of claim 12, wherein the transforming is based upon a type of a query of the queries within a query batch of the plurality of query batches.

16. The computer program product of claim 15, wherein the type comprises an insert query and wherein the transforming comprises hiding data inserted by the query by issuing fake insert queries.

17. The computer program product of claim 15, wherein the type comprises a range query and wherein the transforming comprises identifying splits in a range corresponding to the range query and defining, based upon the security budget, a level in a value tree below which the query should not be transformed.

18. The computer program product of claim 12, wherein the performing comprises creating, by combining sets of transformed values, at least one transformed query and augmenting false-positives.

19. The computer program product of claim 12, wherein the data leakage is calculated based upon a function of a distance between a distribution of access and a uniform distribution.

20. The computer program product of claim 12, wherein the data leakage is calculated based upon an order between elements.

\* \* \* \* \*